(12) United States Patent
Wang

(10) Patent No.: US 12,143,611 B2
(45) Date of Patent: Nov. 12, 2024

(54) SUBPICTURE ENTITY GROUP SIGNALING IN CODED VIDEO

(71) Applicant: Lemon Inc., Grand Cayman (KY)

(72) Inventor: Ye-Kui Wang, San Diego, CA (US)

(73) Assignee: Lemon Inc.

( * ) Notice: Subject to any disclaimer, the term of this patent is extended or adjusted under 35 U.S.C. 154(b) by 0 days.

(21) Appl. No.: 17/476,178

(22) Filed: Sep. 15, 2021

(65) Prior Publication Data

US 2022/0086497 A1    Mar. 17, 2022

Related U.S. Application Data

(60) Provisional application No. 63/079,892, filed on Sep. 17, 2020.

(51) Int. Cl.
*H04N 19/70* (2014.01)
*H04N 7/01* (2006.01)
*H04N 19/44* (2014.01)

(52) U.S. Cl.
CPC ............... *H04N 19/44* (2014.11); *H04N 7/01* (2013.01); *H04N 19/70* (2014.11)

(58) Field of Classification Search
CPC ........... H04N 19/44; H04N 19/70; H04N 7/01
See application file for complete search history.

(56) References Cited

U.S. PATENT DOCUMENTS

| 11,902,552 B2 | 2/2024 | Wang |
| 2014/0301477 A1 | 10/2014 | Deshpande |
| 2015/0264404 A1 | 9/2015 | Hannuksela |
| 2016/0191931 A1 | 6/2016 | Hannuksela |
| 2016/0373771 A1* | 12/2016 | Hendry ................ H04N 19/30 |
| 2017/0111661 A1 | 4/2017 | Boyce |
| 2018/0199070 A1 | 7/2018 | Wang |
| 2021/0014515 A1 | 1/2021 | Hu et al. |
| 2021/0092426 A1 | 3/2021 | Choi et al. |
| 2021/0274204 A1 | 9/2021 | He et al. |

(Continued)

FOREIGN PATENT DOCUMENTS

| TW | 202005401 A | 1/2020 |
| WO | 2013162808 A1 | 10/2013 |

(Continued)

OTHER PUBLICATIONS

Text of ISO/IEC 14496-15:2019 CDAM 2 Carriage of VVC and EVC in ISOBMFF, Motion Picture Expert Group or ISO/IEC JTC/SC29/WG11 (Year: 2020).*

(Continued)

*Primary Examiner* — Leron Beck
*Assistant Examiner* — Berteau Joisil
(74) *Attorney, Agent, or Firm* — Conley Rose, P.C.

(57) ABSTRACT

Systems, methods and apparatus for encoding or decoding a file format that stores one or more images are described. One example method includes performing a conversion between a visual media file and a bitstream of a visual media data according to a format rule, wherein the format rule specifies a characteristic of a syntax element in the visual media file, and wherein the format rule specifies that the syntax element that has a value indicative of a level identification is coded in any one or both of a subpicture common group box or a subpicture multiple groups box using eight bits.

14 Claims, 10 Drawing Sheets

(56) References Cited

U.S. PATENT DOCUMENTS

| | | | |
|---|---|---|---|
| 2021/0321114 A1 | 10/2021 | Hannuksela | |
| 2021/0368208 A1* | 11/2021 | Samuelsson | ....... H04N 19/1883 |
| 2022/0086385 A1 | 3/2022 | Wang | |
| 2022/0086473 A1 | 3/2022 | Wang | |
| 2022/0109861 A1 | 4/2022 | Hannuksela et al. | |
| 2022/0345746 A1* | 10/2022 | Sanchez | ............... H04N 19/188 |

FOREIGN PATENT DOCUMENTS

| | | | |
|---|---|---|---|
| WO | 2015012227 A1 | 1/2015 |
| WO | 2017172783 A1 | 10/2017 |
| WO | 2018173498 A1 | 9/2018 |
| WO | 2019072795 A1 | 4/2019 |
| WO | 2020044254 A1 | 3/2020 |
| WO | 2020146665 A1 | 7/2020 |
| WO | 2020156549 A1 | 8/2020 |

OTHER PUBLICATIONS

Text of ISO/IEC 14496-15:2019 CDAM 2 Carriage of WVC and EVC in ISOBMFF, Motion Picture Expert Group or ISO/IEC JTC/SC29/WG11 (Year: 2020).*

Boyce et al. ""Versatile Supplemental Enhancement Information Messages for Coded Video Bitstreams (Draft 5),"" Joint Video Experts Team (JVET)of ITU-T SG 16 WP 3 and ISO/IEC JTC 1/SC 29/WG 1118th Meeting: by teleconference, Apr. 15-24, 2020, document JVET-S2007, 2020.

Bross et al. "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, document JVET-S2001, 2020.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Deng et al. "AHGP: On General Constraints Information," Joint Video Experts Team (JVET) of ITU-T SG 16 WP 3 and ISO/IEC JTC 1/SC 29/WG 11, 19th Meeting, by teleconference, Jun. 22-Jul. 1, 2020, document JVET-S0050, 2020.

Gruneberg et al. "Subpicture Support in 14496-15 for VVC," ISO/IEC JTC 1/SC 29/WG 11, MPEG, Oct. 2019, Geneva, CH, m50841.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

"Information Technology—Coded Representation of Immersive Media—Part 3: Versatile Video Coding" ISO/IEC ITC 1/SC 29 /WG 11 N 18692, Text of ISO/IEC CD 23090-3, ISO/IEC JTC 1/SC 29/WG 11, Jul. 12, 2019.

"Information Technology—Coding of Audio-Visual Objects—Part 15: Carriage of Network Abstraction Layer (NAL) Unit Structured Video in the ISO Base Media File Format" ISO/IEC 14496-15:2019(E), ISO/IEC JTC 1/SC 29/WG 11, Jan. 13, 2014.

Kammachi-Sreedhar et al. "Miscellaneous Cleanups on Carriage of VVC in ISOBMFF," ISO/IEC JTC1/SC 29/WG 11, Coding of Moving Pictures and Audio, Jun. 2020, m54427.

"Text of ISO/IEC 23008-12:2017 CDAM 3 Support for VVC, EVC, Slideshows and other Improvements" N19460, Jul. 24, 2020, Convenor, ISO/IEC JTC 1/SC 29/WG 11.

"Text of ISO/IEC 14496-15:2019 CDAM 2 Carriage of WVC and EVC in ISOBMFF," ISO/IEC JTC 1/SC 29/WG 11Coding of Moving Pictures and Audio, Apr. 30, 202, N19278.

"Text of ISO/IEC 14496-15:2019 DAM 2 Carriage of VVC and EVC in ISOBMFF," N19454, Jul. 29, 2020, Convenor, ISO/IEC JTC 1/SC 29/WG 11.

"Versatile Supplemental Enhancement Information Messages for Coded Video Bitstreams," Series H: Audiovisual and Multimedia Systems: Infrastructure of Audiovisual Services—Coding of Moving Video, ITU-T Telecommunication Standardization Sector of ITU, H.274, Aug. 2020.

Wang et al. "AHG8: Scalability—PTL and Decoder Scalablilty," Joint Video Experts Team (JVET) of ITU-T SG 16 WP 3 and ISO/IEC JTC 1/SC 29/WG 11, 16th Meeting, Geneva, CH, Oct. 1-11, 2019, document JVET-P0117, 2019.

Extended European Search Report from European Application No. 21197127.0 mailed Nov. 4, 2021.

Extended European Search Report from European Application No. 21197202.1 mailed Nov. 4, 2021.

Extended European Search Report from European Application No. 21197205.4 mailed Nov. 4, 2021.

Examination Report from Indian Patent Application No. 202144042056 dated Apr. 20, 2022 (5 pages).

Examination Report from Indian Patent Application No. 202144042167 dated Jun. 28, 2022 (5 pages).

Non-Final Office Action from U.S. Appl. No. 17/476,134 dated Oct. 14, 2022.

Non-Final Office Action from U.S. Appl. No. 17/476,081 dated Nov. 4, 2022.

"Versatile Video Coding" Recommendation ITU-T H.266, Series H. Augiovisual and Multimedia Systems, Infrastructure of Audiovisual Services—Coding of Moving Video,Aug. 2020 pp. 36-38,55-57,94-100,139-143.

Non-Final Office Action from U.S. Appl. No. 17/476,081 dated Mar. 4, 2024.

Hearing Notice from Indian Patent Application No. 202144042167 dated Jun. 13, 2024.

* cited by examiner

9000

Performing a conversion between a visual media file and a bitstream of a visual media data according to a format rule, wherein the format rule specifies a characteristic of a syntax element in the visual media file, wherein the syntax element has a value that is indicative of a number of bytes used for indicating a constraint information associated with the bitstream — 9002

10002 — Performing a conversion between a visual media file and a bitstream of a visual media data according to a format rule, wherein the format rule specifies a characteristic of a syntax element in the visual media file, and wherein the format rule specifies that the syntax element that has a value indicative of a level identification is coded in any one or both of a subpicture common group box or a subpicture multiple groups box using eight bits

FIG. 10

SUBPICTURE ENTITY GROUP SIGNALING IN CODED VIDEO

CROSS REFERENCE TO RELATED APPLICATIONS

Under the applicable patent law and/or rules pursuant to the Paris Convention, this application is made to timely claim the priority to and benefits of U.S. Provisional Patent Application No. 63/079,892, filed on Sep. 17, 2020. For all purposes under the law, the entire disclosure of the aforementioned application is incorporated by reference as part of the disclosure of this application.

TECHNICAL FIELD

This patent document relates to generation, storage and consumption of digital audio video media information in a file format.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of a video or an image according to a file format.

In one example aspect, a video processing method is disclosed. The method includes performing a conversion between a visual media file and a bitstream of a visual media data according to a format rule, wherein the bitstream includes one or more output layer sets and one or more parameter sets that include one or more profile tier level syntax structures, wherein at least one of the profile tier level syntax structures includes a general constraints information syntax structure, wherein the format rule specifies that a syntax element is included in a configuration record in the visual media file, and wherein the syntax element indicates a profile, a tier, or a level to which an output layer set identified by an output layer set index indicated in the configuration record conforms.

In another example aspect, a video processing method is disclosed. The method includes performing a conversion between a visual media file and a bitstream of a visual media data according to a format rule, wherein the format rule specifies a characteristic of a syntax element in the visual media file, wherein the syntax element has a value that is indicative of a number of bytes used for indicating a constraint information associated with the bitstream.

In another example aspect, a video processing method is disclosed. The method includes performing a conversion between a visual media file and a bitstream of a visual media data according to a format rule, wherein the format rule specifies a characteristic of a syntax element in the visual media file, and wherein the format rule specifies that the syntax element has a value indicative of a level identification is coded in any one or both of a subpicture common group box or a subpicture multiple groups box using eight bits.

In another example aspect, a video processing method is disclosed. The method includes performing a conversion between a visual media data and a file storing a bitstream representation of the visual media data according to a format rule; wherein the format rule specifies a constraint on information included in the file with respect to a profile, a tier, a constrain or a tier associated with the bitstream representation that is identified in the file In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

In yet another example aspect, a computer readable medium having a bitstream stored thereon is disclosed. The bitstream is generated or processed using a method described in the present document.

These, and other, features are described throughout the present document.

BRIEF DESCRIPTION OF DRAWINGS

FIGS. 8 to 10 are flowcharts for example methods of video processing.

DETAILED DESCRIPTION

Figure 1:
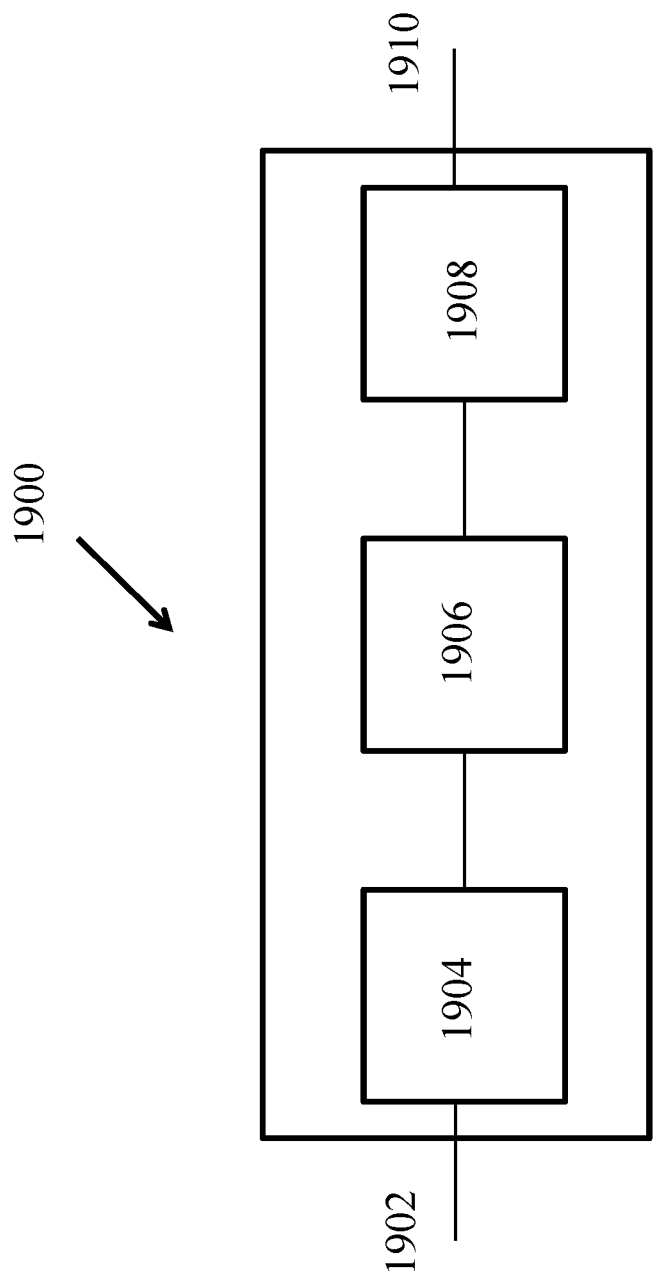
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by open and close double brackets (e.g., [[ ]]) which indicates that the text in between the double brackets is cancelled text, and by boldface italic text indicating added text, with respect to the current draft of the VVC specification or ISOBMFF file format specification.

1. Brief Discussion

This document is related to video file format. Specifically, it is related to signalling of decoder configuration information and subpicture entity groups in media files carrying Versatile Video Coding (VVC) video bitstreams based on the ISO base media file format (ISOBMFF). The ideas may be applied individually or in various combination, for video bitstreams coded by any codec, e.g., the VVC standard, and for any video file format, e.g., the VVC video file format being developed.

2. Abbreviations

ACT adaptive colour transform
ALF adaptive loop filter
AMVR adaptive motion vector resolution
APS adaptation parameter set
AU access unit
AUD access unit delimiter
AVC advanced video coding (Rec. ITU-T H.264|ISO/IEC 14496-10)
B bi-predictive
BCW bi-prediction with CU-level weights
BDOF bi-directional optical flow
BDPCM block-based delta pulse code modulation
BP buffering period
CABAC context-based adaptive binary arithmetic coding
CB coding block
CBR constant bit rate
CCALF cross-component adaptive loop filter
CPB coded picture buffer
CRA clean random access
CRC cyclic redundancy check
CTB coding tree block
CTU coding tree unit
CU coding unit
CVS coded video sequence
DPB decoded picture buffer
DCI decoding capability information
DRAP dependent random access point
DU decoding unit
DUI decoding unit information
EG exponential-Golomb
EGk k-th order exponential-Golomb
EOB end of bitstream
EOS end of sequence
FD filler data
FIFO first-in, first-out
FL fixed-length
GBR green, blue, and red
GCI general constraints information
GDR gradual decoding refresh
GPM geometric partitioning mode
HEVC high efficiency video coding (Rec. ITU-T H.265|ISO/IEC 23008-2)
HRD hypothetical reference decoder
HSS hypothetical stream scheduler
I intra
IBC intra block copy
IDR instantaneous decoding refresh
ILRP inter-layer reference picture
IRAP intra random access point
LFNST low frequency non-separable transform
LPS least probable symbol
LSB least significant bit
LTRP long-term reference picture
LMCS luma mapping with chroma scaling
MIP matrix-based intra prediction
MPS most probable symbol
MSB most significant bit
MTS multiple transform selection
MVP motion vector prediction
NAL network abstraction layer
OLS output layer set
OP operation point
OPI operating point information
P predictive
PH picture header
POC picture order count
PPS picture parameter set
PROF prediction refinement with optical flow
PT picture timing
PU picture unit
QP quantization parameter
RADL random access decodable leading (picture)
RASL random access skipped leading (picture)
RBSP raw byte sequence payload
RGB red, green, and blue
RPL reference picture list
SAO sample adaptive offset
SAR sample aspect ratio
SEI supplemental enhancement information
SH slice header
SLI subpicture level information
SODB string of data bits
SPS sequence parameter set
STRP short-term reference picture
STSA step-wise temporal sublayer access
TR truncated rice
VBR variable bit rate
VCL video coding layer
VPS video parameter set
VSEI versatile supplemental enhancement information (Rec. ITU-T H.274|ISO/IEC 23002-7)
VUI video usability information
VVC versatile video coding (Rec. ITU-T H.266|ISO/IEC 23090-3)

3. Video Coding Introduction

3.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

3.2. File Format Standards

Media streaming applications are typically based on the IP, TCP, and HTTP transport methods, and typically rely on a file format such as the ISO base media file format (ISOBMFF). One such streaming system is dynamic adaptive streaming over HTTP (DASH). For using a video format with ISOBMFF and DASH, a file format specification specific to the video format, such as the AVC file format and the HEVC file format, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format, would be needed.

The VVC video file format, the file format for storage of VVC video content based on ISOBMFF, is currently being developed by MPEG.

The VVC image file format, the file format for storage of image content coded using VVC, based on ISOBMFF, is currently being developed by MPEG.

3.3. Some Specifics of VVC Video File Format 3.3.1. Decoder Configuration Information
3.3.1.1. VVC Decoder Configuration Record
3.3.1.1.1. Definition This subclause specifies the decoder configuration information for ISO/IEC 23090-3 video content.

This record contains the size of the length field used in each sample to indicate the length of its contained NAL units as well as the parameter sets, if stored in the sample entry. This record is externally framed (its size is supplied by the structure that contains it).

This record contains a version field. This version of the specification defines version 1 of this record. Incompatible changes to the record will be indicated by a change of version number. Readers shall not attempt to decode this record or the streams to which it applies if the version number is unrecognised.

Compatible extensions to this record will extend it and will not change the configuration version code. Readers should be prepared to ignore unrecognised data beyond the definition of the data they understand.

VvcPtlRecord shall be present in the decoder configuration record when the track contains a VVC bitstream natively or though resolving 'subp' track references. If the ptl_present_flag is equal to zero in the decoder configuration record of a track then the track shall have an 'oref' track reference. The values for the syntax elements of VvcPTL-Record, chroma_format_idc, and bit_depth_minus8 shall be valid for all parameter sets that are activated when the stream described by this record is decoded (referred to as "all the parameter sets" in the following sentences in this paragraph). Specifically, the following restrictions apply:

The profile indication general_profile_idc shall indicate a profile to which the stream associated with this configuration record conforms.
NOTE 1: If the SPSs are marked with different profiles, then the stream could need examination to determine which profile, if any, the entire stream conforms to. If the entire stream is not examined, or the examination reveals that there is no profile to which the entire stream conforms, then the entire stream shall be split into two or more sub-streams with separate configuration records in which these rules can be met.
The tier indication general_tier_flag shall indicate a tier equal to or greater than the highest tier indicated in all the parameter sets.
Each bit in general_constraint_info may only be set if all the parameter sets set that bit.
The level indication general_level_idc shall indicate a level of capability equal to or greater than the highest level indicated for the highest tier in all the parameter sets.
The following constraints apply for chroma_format_idc:
If the value of sps_chroma_format_idc, as defined in ISO/IEC 23090-3, is the same in all SPSs referenced by the NAL units of the track, chroma_format_idc shall be equal to sps_chroma_format_idc.
Otherwise, if ptl_present_flag is equal to 1, chroma_format_idc shall be equal to vps_ols_dpb_chroma_format[output_layer_set_idx], as defined in ISO/IEC 23090-3.
Otherwise, chroma format idc shall not be present.
The following constraints apply for bit_depth_minus8:
If the value of sps_bitdepth_minus8, as defined in ISO/IEC 23090-3, is the same in all SPSs referenced by the NAL units of the track, bit_depth_minus8 shall be equal to sps_bitdepth_minus8.
Otherwise, if ptl_present_flag is equal to 1, bit_depth_minus8 shall be equal to vps_ols_dpb_bit-depth_minus8[output_layer_set_idx], as defined in ISO/IEC 23090-3.
Otherwise, bit_depth_minus8 shall not be present.

Explicit indication is provided in the VVC Decoder Configuration Record about the chroma format and bit depth as well as other important format information used by the VVC video elementary stream. If the two sequences differ in color space indications in their VUI information, then two different VVC sample entries are also required.

There is a set of arrays to carry initialization NAL units. The NAL unit types are restricted to indicate DCI, VPS, SPS, PPS, prefix APS, and prefix SEI NAL units only. NAL unit types that are reserved in ISO/IEC 23090-3 and in this specification may acquire a definition in future, and readers should ignore arrays with reserved or unpermitted values of NAL unit type.
NOTE 2: This 'tolerant' behaviour is designed so that errors are not raised, allowing the possibility of backwards-compatible extensions to these arrays in future specifications.
NOTE 3: The NAL units carried in a sample entry are included immediately following the AUD and OPI NAL units (if any) in, or otherwise at the beginning of, the access unit reconstructed from the first sample that references the sample entry.

It is recommended that the arrays be in the order DCI, VPS, SPS, PPS, prefix APS, prefix SEI.

3.3.1.1.2. Syntax

```
aligned(8) class VvcPTLRecord(num_sublayers) {
        unsigned int(8) num_bytes_constraint_info;
        unsigned int(7) general_profile_idc;
        unsigned int(1) general_tier_flag;
        unsigned int(8) general_level_idc;
        unsigned int(1) ptl_frame_only_constraint_flag;
        unsigned int(1) ptl_multilayer_enabled_flag;
        if (num_bytes_constraint_info > 0)
        unsigned int(8*num_bytes_constraint_info - 2)
        general_constraint_info; for
(i=num_sublayers - 2; i >= 0; i--)
        unsigned int(1) ptl_sublayer_level_present_flag[i];
        for (j=num_sublayers; j<=8 && num_sublayers > 1; j++)
        bit(1) ptl_reserved_zero_bit = 0;
        for (i=num_sublayers-2; i >= 0; i--)
        if (ptl_sublayer_level_present[i])
        unsigned int(8) sublayer_level_idc[i];
        unsigned int(8) num_sub_profiles;
        for (j=0; j < num_sub_profiles; j++)
        unsigned int(32) general_sub_profile_idc;
}
aligned(8) class VvcDecoderConfigurationRecord {
        unsigned int(8) configurationVersion = 1;
        unsigned int(16) avgFrameRate;
        unsigned int(2) constantFrameRate;
        unsigned int(3) numTemporalLayers;
        unsigned int(2) lengthSizeMinusOne;
        unsigned int(1) ptl_present_flag;
        if (ptl_present_flag) {
        VvcPTLRecord(numTemporalLayers) track_ptl;
        unsigned int(16) output_layer_set_idx;
        }
        unsigned int(1) chroma_format_present_flag;
        if (chroma_format_present_flag)
        unsigned int(2) chroma_format_idc;
        else
        bit(2) reserved = '11'b;
        unsigned int(1) bit_depth_present_flag;
        if (bit_depth_present_flag)
        unsigned int(3) bit_depth_minus8;
        else
        bit(3) reserved = '111'b;
        unsigned int(1) reserved= '1'b;
        unsigned int(8) numOfArrays;
        for (j=0; j < numOfArrays; j++) {
        unsigned int(1) array_completeness;
        bit(1) reserved = 0;
        unsigned int(6) NAL_unit_type;
        unsigned int(16) numNalus;
        for (i=0; i< numNalus; i++) {
        unsigned int(16) nalUnitLength;
        bit(8*nalUnitLength) nalUnit;
        }
        }
}
```

3.3.1.1.3. Semantics general_profile_idc, general_tier_flag, general_sub_profile_idc, general_constraint_info, general_level_idc, ptl_frame_only_constraint_flag, ptl_multilayer_enabled_flag, sublayer_level_present, and sublayer_level_idc[i] contain the matching values for the fields general_profile_idc, general_tier_flag, general_sub_profile_idc, the bits in general_constraint_info( ), general_level_idc, ptl_multilayer_enabled_flag, ptl_frame_only_constraint_flag, sublayer_level_present, and sublayer_level_idc[i] as defined in ISO/IEC 23090-3, for the stream to which this configuration record applies.

avgFrameRate gives the average frame rate in units of frames/(256 seconds), for the stream to which this configuration record applies. Value 0 indicates an unspecified average frame rate.

constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate.

numTemporalLayers greater than 1 indicates that the track to which this configuration record applies is temporally scalable and the contained number of temporal layers (also referred to as temporal sublayer or sublayer in ISO/IEC 23090-3) is equal to numTemporalLayers. Value 1 indicates that the track to which this configuration record applies is not temporally scalable. Value 0 indicates that it is unknown whether the track to which this configuration record applies is temporally scalable.

lengthSizeMinusOne plus 1 indicates the length in bytes of the NALUnitLength field in a VVC video stream sample in the stream to which this configuration record applies. For example, a size of one byte is indicated with a value of 0. The value of this field shall be one of 0, 1, or 3 corresponding to a length encoded with 1, 2, or 4 bytes, respectively.

ptl_present_flag equal to 1 specifies that the track contains a VVC bitstream corresponding to a specific output layer set. ptl_present_flag equal to 0 specifies that the track may not contain a VVC bitstream corresponding to a specific output layer set, but rather may contain one or more individual layers that do not form an output layer set or individual sublayers excluding the sublayer with TemporalId equal to 0.

num_sub_profiles defines the number of sub profiles indicated in the decoder configuration record.

track_ptl specifies the profile, tier, and level of the output layer set represented by the VVC bitstream contained in the track.

output_layer_set_idx specifies the output layer set index of an output layer set represented by the VVC bitstream contained in the track. The value of output layer set idx may be used as the value of the TargetOlsIdx variable provided by external means to the VVC decoder, as specified in ISO/IEC 23090-3, for decoding the bitstream contained in the track.

chroma_format_present_flag equal to 0 specifies that chroma_format_idc is not present. chroma_format_present_flag equal to 1 specifies that chroma_format_idc is present.

chroma_format_idc indicates the chroma format that applies to this track. The following constraints apply for chroma_format_idc:

If the value of sps_chroma_format_idc, as defined in ISO/IEC 23090-3, is the same in all SPSs referenced by the NAL units of the track, chroma_format_idc shall be equal to sps_chroma_format_idc.

Otherwise, if ptl_present_flag is equal to 1, chroma_format_idc shall be equal to vps_ols_dpb_chroma_format[output_layer_set_idx], as defined in ISO/IEC 23090-3.

Otherwise, chroma_format_idc shall not be present.

bit_depth_present_flag equal to 0 specifies that bit_depth_minus8 is not present. bit_depth_present_flag equal to 1 specifies that bit_depth_minus8 is present.

bit_depth_minus8 indicates the bit depth that applies to this track. The following constraints apply for bit_depth_minus8:

If the value of sps_bitdepth_minus8, as defined in ISO/IEC 23090-3, is the same in all SPSs referenced by the NAL units of the track, bit_depth_minus8 shall be equal to sps_bitdepth_minus8.

Otherwise, if ptl_present_flag is equal to 1, bit_depth_minus8 shall be equal to vps_ols_dpb_bit-depth_minus8[output_layer_set_idx], as defined in ISO/IEC 23090-3.

Otherwise, bit_depth_minus8 shall not be present.

numArrays indicates the number of arrays of NAL units of the indicated type(s).

array_completeness when equal to 1 indicates that all NAL units of the given type are in the following array and none are in the stream; when equal to 0 indicates that additional NAL units of the indicated type may be in the stream; the default and permitted values are constrained by the sample entry name.

NAL_unit_type indicates the type of the NAL units in the following array (which shall be all of that type); it takes a value as defined in ISO/IEC 23090-2; it is restricted to take one of the values indicating a DCI, VPS, SPS, PPS, APS, prefix SEI, or suffix SEI NAL unit.

numNalus indicates the number of NAL units of the indicated type included in the configuration record for the stream to which this configuration record applies. The SEI array shall only contain SEI messages of a 'declarative' nature, that is, those that provide information about the stream as a whole. An example of such an SEI could be a user-data SEI.

nalUnitLength indicates the length in bytes of the NAL unit.

nalUnit contains a DCI, VPS, SPS, PPS, APS or declarative SEI NAL unit, as specified in ISO/IEC 23090-3.

3.3.2. Subpicture Entity Groups 3.3.2.1. General

Subpicture entity groups are defined providing level information indicating conformance of a merged bitstream out of several VVC subpicture tracks.

NOTE: VVC base tracks provides another mechanism for merging VVC subpicture tracks.

Implicit reconstruction process requires modification of parameter sets. The subpicture entity groups give guidance to ease parameter set generation for the reconstructed bitstreams.

When the coded subpictures within the group that are to be jointly decoded are interchangeable, i.e. the player selects a number of active tracks from a group of sample-wise subpictures with the same level contribution, the SubpicCommonGroupBox indicates the combinatorial rules and the level_idc of a resulting combination when decoded jointly.

When there are coded subpictures with different properties, e.g. different resolution, which are selected to be jointly decoded, the SubpicMultipleGroupsBox indicates the combinatorial rules and the level_idc of a resulting combination when decoded jointly.

All the entity_id values included in the subpicture entity groups shall identify VVC subpicture tracks. When present, SubpicCommonGroupBox and SubpicMultipleGroupsBox shall be contained in the GroupsListBox in the movie-level MetaBox and shall not be contained in file-level or track-level MetaBoxes.

3.3.2.2. Syntax of Subpicture Common Group Box

```
aligned(8) class SubpicCommonGroupBox extends
EntityToGroupBox('acgl',0,0)
{
```

```
unsigned int(32) level_idc;
unsigned int(32) num_active_tracks;
}
```

3.3.2.3. Semantics of Subpicture Common Group Box level_idc specifies the level to which any selection of num_active_tracks entities among the entity group conforms.

num_active_tracks specifies the number of tracks for which the value of level_idc is provided.

3.3.2.4. Syntax of Subpicture Multiple Groups Box

```
aligned(8) class SubpicMultipleGroupsBox extends
EntityToGroupBox('amgl',0,0)
{
unsigned int(32) level_idc;
unsigned int(32) num_subgroup_ids;
subgroupIdLen = (num_subgroup_ids >= (1 << 24)) ? 32 :
(num_subgroup_ids >= (1 << 16)) ? 24 :
(num_subgroup_ids >= (1 << 8)) ? 16 : 8;
for (i = 0; i < num_entities_in_group; i++)
unsigned int(subgroupIdLen) track_subgroup_id[i];
for (i = 0; i < num_subgroup_ids; i++)
unsigned int(32) num_active_tracks[i];
}
```

3.3.2.5. Semantics level_idc specifies the level to which the combination of selecting any num_active_tracks[i] tracks among the subgroup with ID equal to i for all values of i in the range of 0 to num_subgroup_ids−1, inclusive, conforms.

num_subgroup_ids specifies the number of separate subgroups, each identified by the same value of track_subgroup_id[i]. Different subgroups are identified by different values of track_subgroup_id[i].

track_subgroup_id[i] specifies the subgroup ID for the i-th track in this entity group. subgroup ID values shall range from 0 to num_subgroup_ids−1, inclusive.

num_active_tracks[i] specifies the number of tracks among the subgroup with ID equal to i that is documented in level_idc.

4. Examples of Technical Problems Solved by Disclosed Technical Solutions

The latest designs of the VVC video file format regarding the signalling of decoder configuration information and information of subpicture entity groups have the following problems:

1) It is specified that the profile indication general_profile_idc shall indicate a profile to which the stream associated with this configuration record conforms. However, the stream may correspond to multiple output layer sets, thus this semantics can allow for a wrong value of general_profile_idc being signalled in a configuration record.

2) It is specified that the tier indication general_tier_flag shall indicate a tier equal to or greater than the highest tier indicated in all the parameter sets. However, there can be profile_tier_level( ) structures that are signalled in the parameter sets and apply to OLSs not in the scope of the current configuration record, thus this semantics can allow for a wrong value of this field being signalled in a configuration record. Furthermore, there there can be profile_tier_level( ) structures signalled in the parameter sets that are not referenced, and the VPS can include PTL structures that apply to OL_Ss not in the scope of the current configuration record.

3) It is specified that each bit in general_constraint_info may only be set if all the parameter sets set that bit. However, there can be profile_tier_level( ) structures that are signalled in the parameter sets and apply to OLSs not in the scope of the current configuration record, thus this semantics can allow for a wrong value of this field being signalled in a configuration record.

4) It is specified that the level indication general_level_idc shall indicate a level of capability equal to or greater than the highest level indicated for the highest tier in all the parameter sets. However, there can be profile_tier_level( ) structures that are signalled in the parameter sets and apply to OLSs not in the scope of the current configuration record. Furthermore, the highest level of the highest tier could be lower than the highest level of the lowest tier, while level determines max picture width, height, etc., which are of vital importance for determining the required decoding capability. Therefore, this semantics can allow for a wrong value of this field being signalled in a configuration record.

5) In the syntax and semantics of the VvcPTLRecord( ) syntax structure, they are the following issues related to the fields num_bytes_constraint_info and general_constraint_info:
   a. The field num_bytes_constraint_info is coded using 8 bits. However, the maximum number of bits in the general_constraint_info( ) syntax structure defined in the VVC specification is 336 bits, i.e., 42 bytes, thus using 6 bits is sufficient.
   b. Furthermore, the semantics of the field num_bytes_constraint_info is missing.
   c. The field general_constraint_info is conditioned on "if (num_bytes_constraint_info>0)". However, in the profile_tier_level( ) syntax structure defined in the VVC specification, whenever profile, tier, and level are present, the general_constraint_info( ) syntax structure is present, while even when the first syntax element, gci_present_flag, in the general_constraint_info( ) syntax structure is equal to 0, the length of the general_constraint_info( ) syntax structure is still one byte, not zero byte. Therefore, the condition should be changed to be "if (num_bytes_constraint_info>1)", i.e., not to signal field general_constraint_info when gci_present_flag of the general_constraint_info( ) syntax structure is equal to 0.
   d. The field general_constraint_info is coded using (8*num_bytes_constraint_info−2) bits. However, the length of general_constraint_info, i.e., the general_constraint_info( ) syntax structure defined in the VVC specification is of integer bytes.

6) In the VvcDecoderConfigurationRecord, the field output_layer_set_idx is always siganlled when ptl_present_flag is equal to 1 (i.e., when the track_ptl field is signalled). However, if the VVC bitstream carried by a VVC track (after resolving referenced VVC tracks or VVC subpicture tracks, if any) is a single-layer bitstream, there is often no need to know the value of the OLS index, and even it is useful to know the OLS index, it can be easily derived to be the OLS index of the OLS that contains only the layer.

7) The NAL_unit_type field in the VvcDecoderConfigurationRecord is used using 6 bits. However, 5 bits would be sufficient.

8) The semantics of ptl_present_flag is specified as follows: ptl_present_flag equal to 1 specifies that the track contains a VVC bitstream corresponding to a specific output layer set. ptl_present_flag equal to 0 specifies that the track may not contain a VVC bitstream corresponding to a specific output layer set, but rather may contain one or more individual layers that do not form an output layer set or individual sublayers excluding the sublayer with TemporalId equal to 0.
   However, the case where the track contain a VVC bitstream corresponding to multiple output layer sets is not covered.

9) The level_idc field in the SubpicCommonGroupBox and the SubpicMultipleGroupsBox is coded using 32 bits. However, 8 bits would be sufficient.

10) The num_active_tracks field in the SubpicCommonGroupBox, and the num_subgroup_ids field and the num_active_tracks[i] field in the SubpicMultipleGroupsBox are all coded using 32 bits. However, 16 bits would be sufficient for all of them.

5. A Listing of Solutions

To solve the above problems, and others, methods as summarized below are disclosed. The items should be considered as examples to explain the general concepts and should not be interpreted in a narrow way. Furthermore, these items can be applied individually or combined in any manner.

1) To solve problem 1, it is specified that the profile indication general_profile_idc shall indicate a profile to which the output layer set identified by output_layer_set_idx in this configuration record conforms.

2) To solve problem 2, it is specified that the tier indication general_tier_flag shall indicate a tier equal to or greater than the highest tier indicated in all the profile_tier_level( ) syntax structures (in all the parameter sets) to which the output layer set identified by output_layer_set_idx in this configuration record conforms.
   a. Alternatively, it is specified that the tier indication general_tier_flag shall indicate the highest tier indicated in all the profile_tier_level( ) syntax structures (in all the parameter sets) to which the output layer set identified by output_layer_set_idx in this configuration record conforms.
   b. Alternatively, it is specified that the tier indication general_tier_flag shall indicate the highest tier to which the stream associated with this configuration record conforms.
   c. Alternatively, it is specified that the tier indication general_tier_flag shall indicate a tier to which the stream associated with this configuration record conforms.

3) To solve problem 3, it is specified that each bit in general_constraint_info may only be set if the bit is set in all the general_constraints_info( ) syntax structures in all the profile_tier_level( ) syntax structures (in all the parameter sets) to which the output layer set identified by output_layer_set_idx in this configuration record conforms.

4) To solve problem 4, it is specified that the level indication general_level_idc shall indicate a level of capability equal to or greater than the highest level in all the profile_tier_level( ) syntax structures (in all the parameter sets) to which the output layer set identified by output_layer_set_idx in this configuration record conforms.

5) To solve problem 5, one or more of the following items are proposed:
   a. The field num_bytes_constraint_info is coded using 6 bits.

b. The field num_bytes_constraint_info is coded immediately after the ptl_multilayer_enabled_flag field.
c. The semantics of the field num_bytes_constraint_info is specified as follows: num_bytes_constraint_info specifies the number of bytes in the general_constraint_info( ) syntax structure as defined in ISO/IEC 23090-3. The value equal to 1 indicates that gci_present_flag in the general_constraint_info( ) syntax structure is equal to 0, and the field general_constraint_info is not signalled in this VvcPTLRecord.
d. The condition for signalling of the field general_constraint_info is changed from "if (num_bytes_constraint_info>0)" to "if (num_bytes_constraint_info>1)".
e. The field general_constraint_info is coded using 8*num_bytes_constraint_info bits instead of (8*num_bytes_constraint_info−2) bits.

6) To solve problem 6, the signalling of the field output_layer_set_idx in the VvcDecoderConfigurationRecord is optional even when ptl_present_flag is equal to 1, e.g., conditioned on "if(track_ptl.ptl_multilayer_enabled_flag)", which indicates that the VVC bitstream contains only one layer carried in the VVC track (after resolving referenced VVC tracks or VVC subpicture tracks, if any).
a. Alternatively, when ptl_present_flag is equal to 1 and output_layer_set_idx is not present, its value is inferred to be equal to the OLS index of the OLS that contains only the layer carried in the VVC track (after resolving referenced VVC tracks or VVC subpicture tracks, if any).

7) To solve problem 7, the NAL_unit_type field in the VvcDecoderConfigurationRecord is used using 5 bits instead of 6 bits.

8) To solve problem 8, the semantics of ptl_present_flag is specified as follows: ptl_present_flag equal to 1 specifies that the track contains a VVC bitstream corresponding to a specific output layer set. ptl_present_flag equal to 0 specifies that the track may not contain a VVC bitstream corresponding to a specific output layer set, but rather may contain a VVC bitstream corresponding to multiple output layer sets or may contain one or more individual layers that do not form an output layer set or individual sublayers excluding the sublayer with TemporalId equal to 0.

9) To solve problem 9, it is specified that the coding of the level_idc field in either or both of the SubpicCommonGroupBox and the SubpicMultipleGroupsBox is changed to use 8 bits.
a. Alternatively, furthermore, the subsequent 24 bits after the level_idc field are specified as reserved bits.
b. Alternatively, furthermore, the subsequent 8 bits after the level_idc field are specified as reserved bits.
c. Alternatively, furthermore, zero subsequent bits after the level_idc field are specified as reserved bits.

10) To solve problem 10, it is specified that the coding of one or more of the num_active_tracks field in the SubpicCommonGroupBox, and the num_subgroup_ids field and the num_active_tracks[i] field in the SubpicMultipleGroupsBox, is changed to use 16 bits.
a. Alternatively, furthermore, the subsequent 16 bits after one or more of the above fields field are specified as reserved bits.
b. Alternatively, furthermore, zero subsequent bits after one or more of the above fields field are specified as reserved bits.

6. Embodiments

Below are some example embodiments for some of the invention aspects summarized above in Section 5, which can be applied to the standard specification for VVC video file format. The changed texts are based on the latest draft specification. Most relevant parts that have been added or modified are indicated by boldface italics text, and some of the deleted parts are indicated by open and close double brackets (e.g., [[ ]]) with the deleted text in between the double brackets indicating the deleted or cancelled text. There may be some other changes that are editorial in nature and thus not highlighted.

6.1. First Embodiment

This embodiment is for items 1, 2, 3, 4, 5a, 5b, 5c, 5d, 5e, 6, 6a, 7, and 8.

6.1.1. Decoder Configuration Information
6.1.1.1. VVC Decoder Configuration Record
6.1.1.1.1. Definition This subclause specifies the decoder configuration information for ISO/IEC 23090-3 video content.

This record contains the size of the length field used in each sample to indicate the length of its contained NAL units as well as the parameter sets, DCI, and SEI NAL units, if stored in the sample entry. This record is externally framed (its size is supplied by the structure that contains it).

This record contains a version field. This version of the specification defines version 1 of this record. Incompatible changes to the record will be indicated by a change of version number. Readers shall not attempt to decode this record or the streams to which it applies if the version number is unrecognised.

Compatible extensions to this record will extend it and will not change the configuration version code. Readers should be prepared to ignore unrecognised data beyond the definition of the data they understand.

VvcPtlRecord shall be present in the decoder configuration record when the track contains a VVC bitstream natively or though resolving 'subp' track references, and in this case the specific output layer set for the VVC bitstream is indicated by the field output_layer_set_idx. If the ptl_present_flag is equal to zero in the decoder configuration record of a track then the track shall have an 'oref' track reference.

The values for the syntax elements of VvcPTLRecord, chroma_format_idc, and bit_depth_minus8 shall be valid for all parameter sets that are [[activated]] referenced when the stream described by this record is decoded (referred to as "all the parameter sets" in the following sentences in this paragraph). Specifically, the following restrictions apply:

The profile indication general_profile_idc shall indicate a profile to which the output layer set identified by output_layer_set_idx in [[stream associated with]] this configuration record conforms.

NOTE 1: If [[the SPSs are marked with]] different profiles are marked for different CVSs of the output layer set identified by output_layer_set_idx in this configuration record, then the stream could need examination to determine which profile, if any, the entire stream conforms to. If the entire stream is not examined, or the examination reveals that there is no profile to which the entire stream conforms, then the entire stream need to be split into two or more sub-streams with separate configuration records in which these rules can be met.

The tier indication general_tier_flag shall indicate a tier equal to or greater than the highest tier indicated in all [[the parameter sets]] the profile_tier_level( ) syntax structures (in all the parameter sets) to which the output layer set identified by output_layer_set_idx in this configuration record conforms.

Each bit in general_constraint_info may only be set if [[all the parameter sets set that bit]] the bit is set in all the general_constraints_info( ) syntax structures in all the profile_tier_level( ) syntax structures (in all the parameter sets) to which the output layer set identified by output_layer_set_idx in this configuration record conforms.

The level indication general_level_idc shall indicate a level of capability equal to or greater than the highest level [[indicated for the highest tier]] in all [[the parameter sets]] the profile_tier_level( ) syntax structures (in all the parameter sets) to which the output layer set identified by output_layer_set_idx in this configuration record conforms.

The following constraints apply for chroma_format_idc:
  If the value of sps_chroma_format_idc, as defined in ISO/IEC 23090-3, is the same in all SPSs referenced by the NAL units of the track, chroma_format_idc shall be equal to sps_chroma_format_idc.
  Otherwise, if ptl_present_flag is equal to 1, chroma_format_idc shall be equal to vps_ols_dpb_chroma_format[output_layer_set_idx], as defined in ISO/IEC 23090-3.
  Otherwise, chroma_format_idc shall not be present.

The following constraints apply for bit_depth_minus8:
  If the value of sps_bitdepth_minus8, as defined in ISO/IEC 23090-3, is the same in all SPSs referenced by the NAL units of the track, bit_depth_minus8 shall be equal to sps_bitdepth_minus8.
  Otherwise, if ptl_present_flag is equal to 1, bit_depth_minus8 shall be equal to vps_ols_dpb_bit-depth_minus8[output_layer_set_idx], as defined in ISO/IEC 23090-3.
  Otherwise, bit_depth_minus8 shall not be present.

Explicit indication is provided in the VVC Decoder Configuration Record about the chroma format and bit depth as well as other important format information used by the VVC video elementary stream. If two sequences differ in color space or bit depth indications in their VUI information, then two different VVC sample entries are also required.

There is a set of arrays to carry initialization non-VCL NAL units. The NAL unit types are restricted to indicate DCI, VPS, SPS, PPS, prefix APS, and prefix SEI NAL units only. NAL unit types that are reserved in ISO/IEC 23090-3 and in this specification may acquire a definition in future, and readers should ignore arrays with reserved or unpermitted values of NAL unit type.

NOTE 2: This 'tolerant' behaviour is designed so that errors are not raised, allowing the possibility of backwards-compatible extensions to these arrays in future specifications.
  NOTE 3: The NAL units carried in a sample entry are included immediately following the AUD and OPI NAL units (if any) in, or otherwise at the beginning of, the access unit reconstructed from the first sample that references the sample entry.

It is recommended that the arrays be in the order DCI, VPS, SPS, PPS, prefix APS, prefix SEI.

6.1.1.1.2. Syntax

```
aligned(8) class VvcPTLRecord(num_sublayers) {
    [[unsigned int(8) num_bytes_constraint_info;]]
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    unsigned int(6) num_bytes_constraint_info;
    [[if (num_bytes_constraint_info > 0)]]
    [[unsigned int(8*num_bytes_constraint_info - 2)
    general_constraint_info;]]
    if (num_bytes_constraint_info > 1)
 unsigned int(8*num_bytes_constraint_info) general_constraint_info;
 for
 (i=num_sublayers -2; i >= 0; i--)
    unsigned int(1) ptl_sublayer_level_present_flag[i];
    for (j=num_sublayers; j<=8 && num_sublayers > 1; j++)
 bit(1) ptl_reserved_zero_bit = 0;
    for (i=num_sublayers-2; i >= 0; i--)
    if (ptl_sublayer_level_present[i])
    unsigned int(8) sublayer_level_idc[i];
    unsigned int(8) num_sub_profiles;
    for (j=0; j < num_sub_profiles; j++)
    unsigned int(32) general_sub_profile_idc[j] ;
}
aligned(8) class VvcDecoderConfigurationRecord {
    unsigned int(8) configurationVersion = 1;
    unsigned int(16) avgFrameRate;
    unsigned int(2) constantFrameRate;
    unsigned int(3) numTemporalLayers;
    unsigned int(2) lengthSizeMinusOne;
    unsigned int(1) ptl_present_flag;
    if (ptl_present_flag) {
    VvcPTLRecord(numTemporalLayers) track_ptl;
    if (track_ptl.ptl_multilayer_enabled_flag)
    unsigned int(16) output_layer_set_idx; }
    unsigned int(1) chroma_format_present_flag;
    if (chroma_format_present_flag)
    unsigned int(2) chroma_format_idc;
    else
    bit(2) reserved = '11'b;
    unsigned int(1) bit_depth_present_flag;
    if (bit_depth_present_flag)
    unsigned int(3) bit_depth_minus8;
    else
    bit(3) reserved = '111'b;
    unsigned int(1) reserved= '1'b;
    unsigned int(8) numOfArrays;
    for (j=0; j < numOfArrays; j++) {
    unsigned int(1) array_completeness;
    [[bit(1) reserved = 0;]]
    [[unsigned int(6) NAL_unit_type;]]
    bit(2) reserved = 0;
    unsigned int(5) NAL_unit_type;
    unsigned int(16) numNalus;
    for (i=0; i< numNalus; i++) {
    unsigned int(16) nalUnitLength;
    bit(8*nalUnitLength) nalUnit;
    }
    }
}
```

6.1.1.1.3. Semantics general_profile_idc, general_tier_flag, general_level_idc, ptl_frame_only_constraint_flag, ptl_multilayer_enabled_flag, general_constraint_info, ptl_sublayer_level_present[i], sublayer_level_idc[i], num_sub_profiles, and general_sub_profile_idc[j], contain the matching values for the fields or syntax structures general_profile_idc, general_tier_flag, general_level_idc, ptl_frame_only_constraint_flag, ptl_multilayer_enabled_flag, general_constraint_info( ), ptl_sublayer_level_present[i], sublayer_level_idc[i], ptl_num_sub_profiles, and general_sub_profile_idc[j], as defined in ISO/IEC 23090-3, for the stream to which this configuration record applies.

num_bytes_constraint_info specifies the number of bytes in the general constraint info( ) syntax structure as defined in ISO/IEC 23090-3. The value equal to 1 indicates that gci_present_flag in the general_constraint_info( ) syntax structure is equal to 0, and the field general_constraint_info is not signalled in this VvcPTLRecord.

avgFrameRate gives the average frame rate in units of frames/(256 seconds), for the stream to which this configuration record applies. Value 0 indicates an unspecified average frame rate.

constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate.

numTemporalLayers greater than 1 indicates that the track to which this configuration record applies is temporally scalable and the contained number of temporal layers (also referred to as temporal sublayer or sublayer in ISO/IEC 23090-3) is equal to numTemporalLayers. Value 1 indicates that the track to which this configuration record applies is not temporally scalable. Value 0 indicates that it is unknown whether the track to which this configuration record applies is temporally scalable.

lengthSizeMinusOne plus 1 indicates the length in bytes of the NALUnitLength field in a VVC video stream sample in the stream to which this configuration record applies. For example, a size of one byte is indicated with a value of 0. The value of this field shall be one of 0, 1, or 3 corresponding to a length encoded with 1, 2, or 4 bytes, respectively.

ptl_present_flag equal to 1 specifies that the track contains a VVC bitstream corresponding to a specific output layer set. ptl_present_flag equal to 0 specifies that the track may not contain a VVC bitstream corresponding to a specific output layer set, but rather may contain a VVC bitstream corresponding to multiple output layer sets or may contain one or more individual layers that do not form an output layer set or individual sublayers excluding the sublayer with TemporalId equal to 0.

track_ptl specifies the profile, tier, and level of the output layer set represented by the VVC bitstream contained in the track.

output_layer_set_idx specifies the output layer set index of an output layer set represented by the VVC bitstream contained in the track. The value of output_layer_set_idx may be used as the value of the TargetOlsIdx variable provided by external means to the VVC decoder, as specified in ISO/IEC 23090-3, for decoding the bitstream contained in the track. When ptl_present_flag is equal to 1 and output_layer_set_idx is not present, its value is inferred to be equal to the OLS index of the OLS that contains only the layer carried in the VVC track (after resolving referenced VVC tracks or VVC subpicture tracks, if any).

chroma_format_present_flag equal to 0 specifies that chroma_format_idc is not present. chroma_format_present_flag equal to 1 specifies that chroma_format_idc is present.

chroma_format_idc indicates the chroma format that applies to this track.

bit_depth_present_flag equal to 0 specifies that bit_depth_minus8 is not present. bit_depth_present_flag equal to 1 specifies that bit_depth_minus8 is present.

bit_depth_minus8 indicates the bit depth that applies to this track.

numArrays indicates the number of arrays of NAL units of the indicated type(s).

array_completeness when equal to 1 indicates that all NAL units of the given type are in the following array and none are in the stream; when equal to 0 indicates that additional NAL units of the indicated type may be in the stream; the permitted values are constrained by the sample entry name.

NAL_unit_type indicates the type of the NAL units in the following array (which shall be all of that type); it takes a value as defined in ISO/IEC 23090-3; it is restricted to take one of the values indicating a DCI, VPS, SPS, PPS, prefix APS or prefix SEI NAL unit.

numNalus indicates the number of NAL units of the indicated type included in the configuration record for the stream to which this configuration record applies. The SEI array shall only contain SEI messages of a 'declarative' nature, that is, those that provide information about the stream as a whole. An example of such an SEI could be a user-data SEI.

nalUnitLength indicates the length in bytes of the NAL unit.

nalUnit contains a DCI, VPS, SPS, PPS, APS or declarative SEI NAL unit, as specified in ISO/IEC 23090-3.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
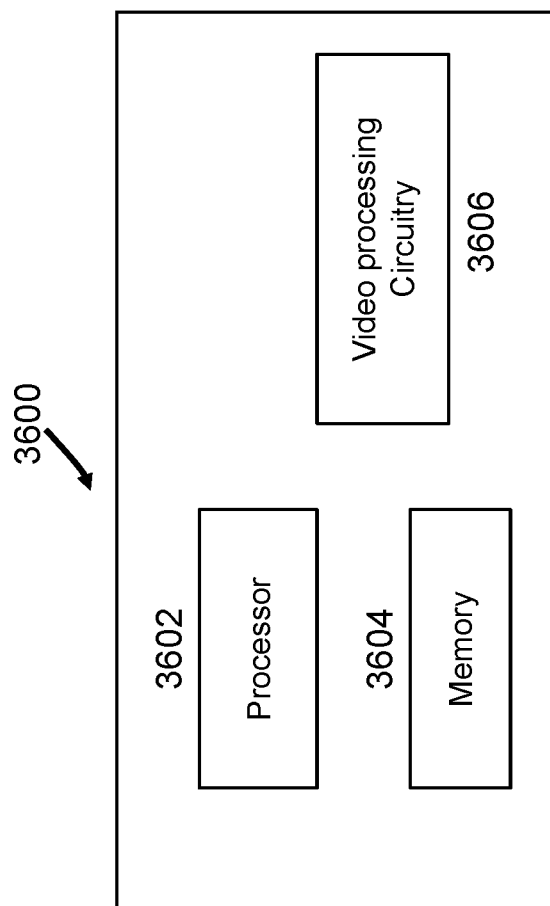
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document. In some embodiments, the video processing hardware 3606 may be at least partly included in the processor 3602, e.g., a graphics co-processor.

Figure 4:
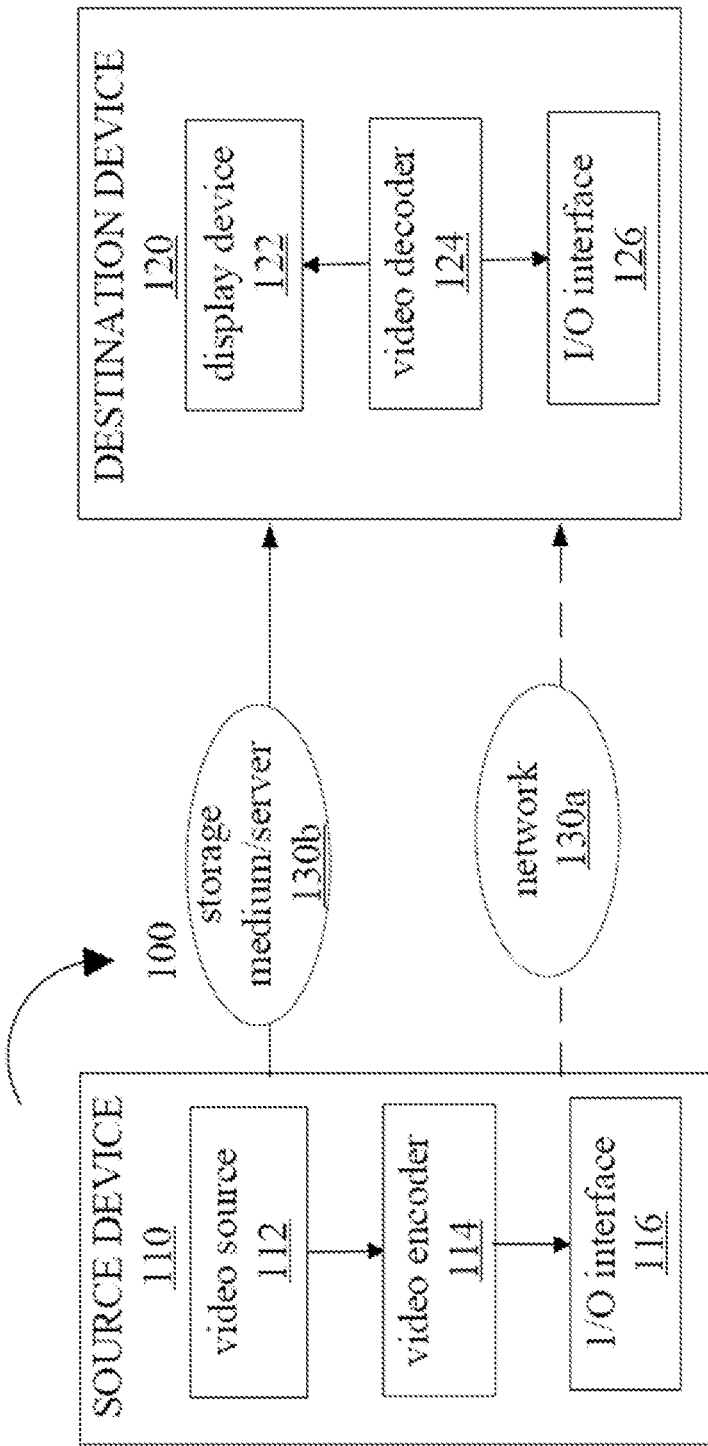
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
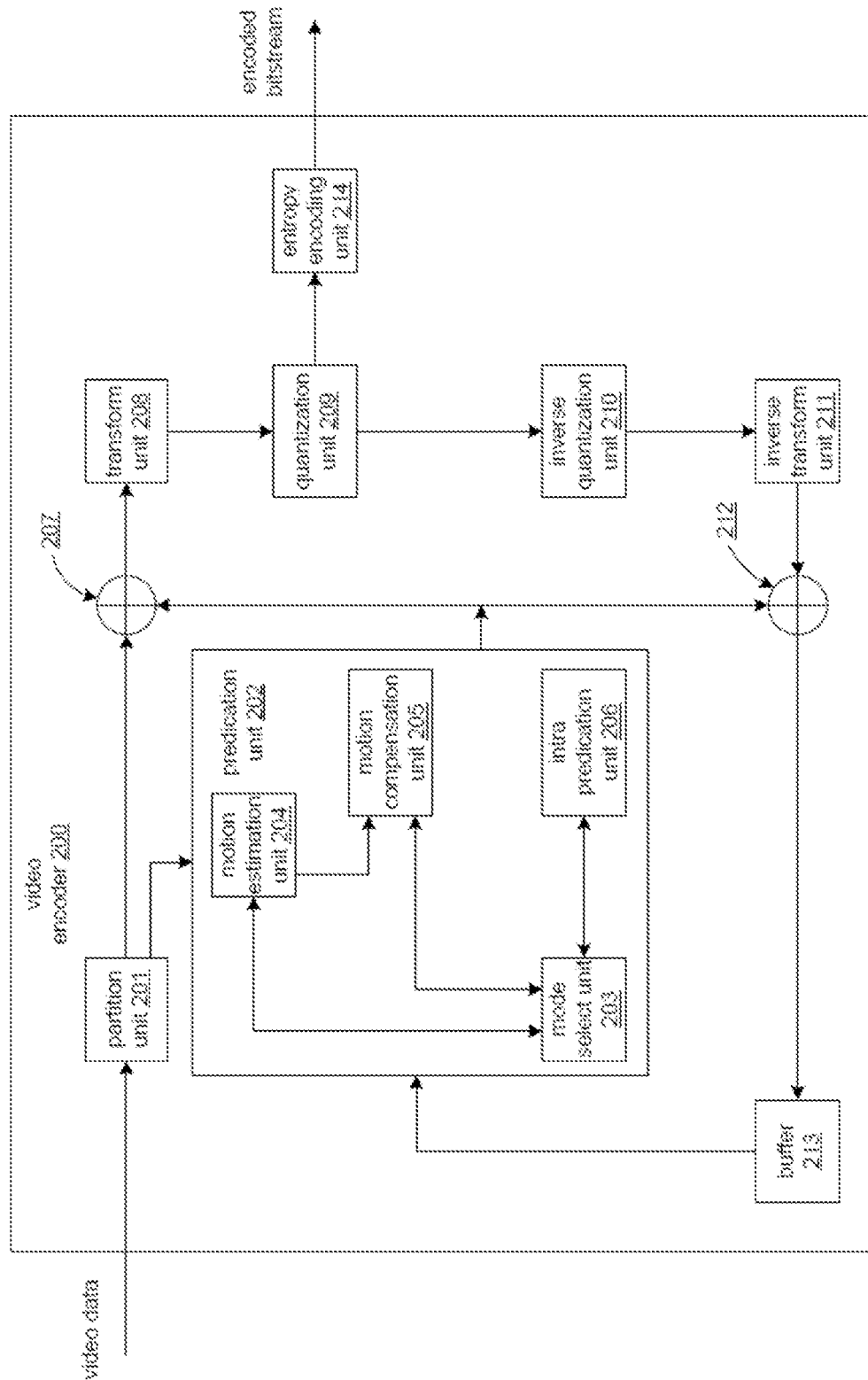
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
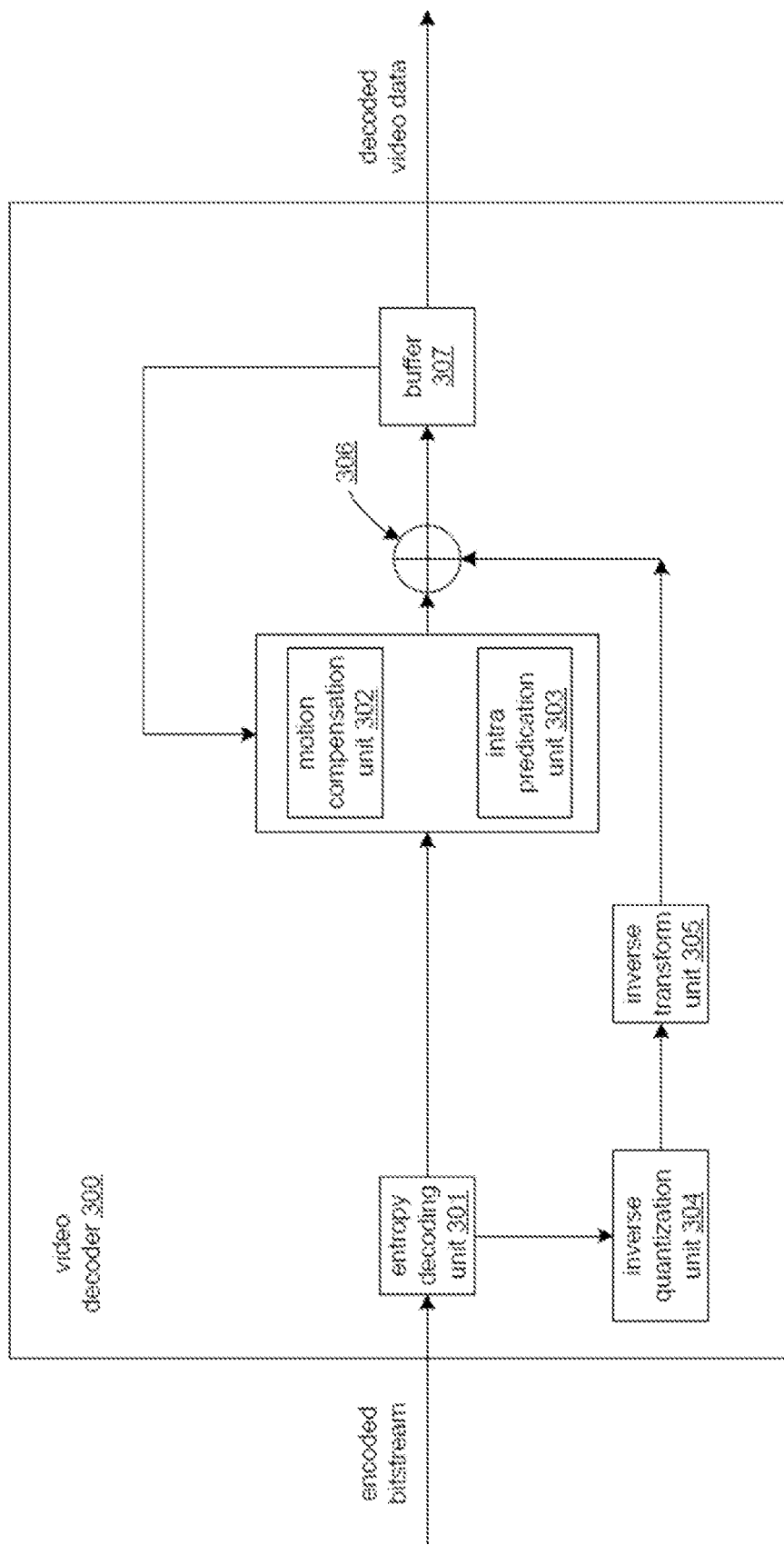
FIG. 6 is a block diagram that illustrates a decoder in accordance with some embodiments of the present disclosure.
Figure 7:
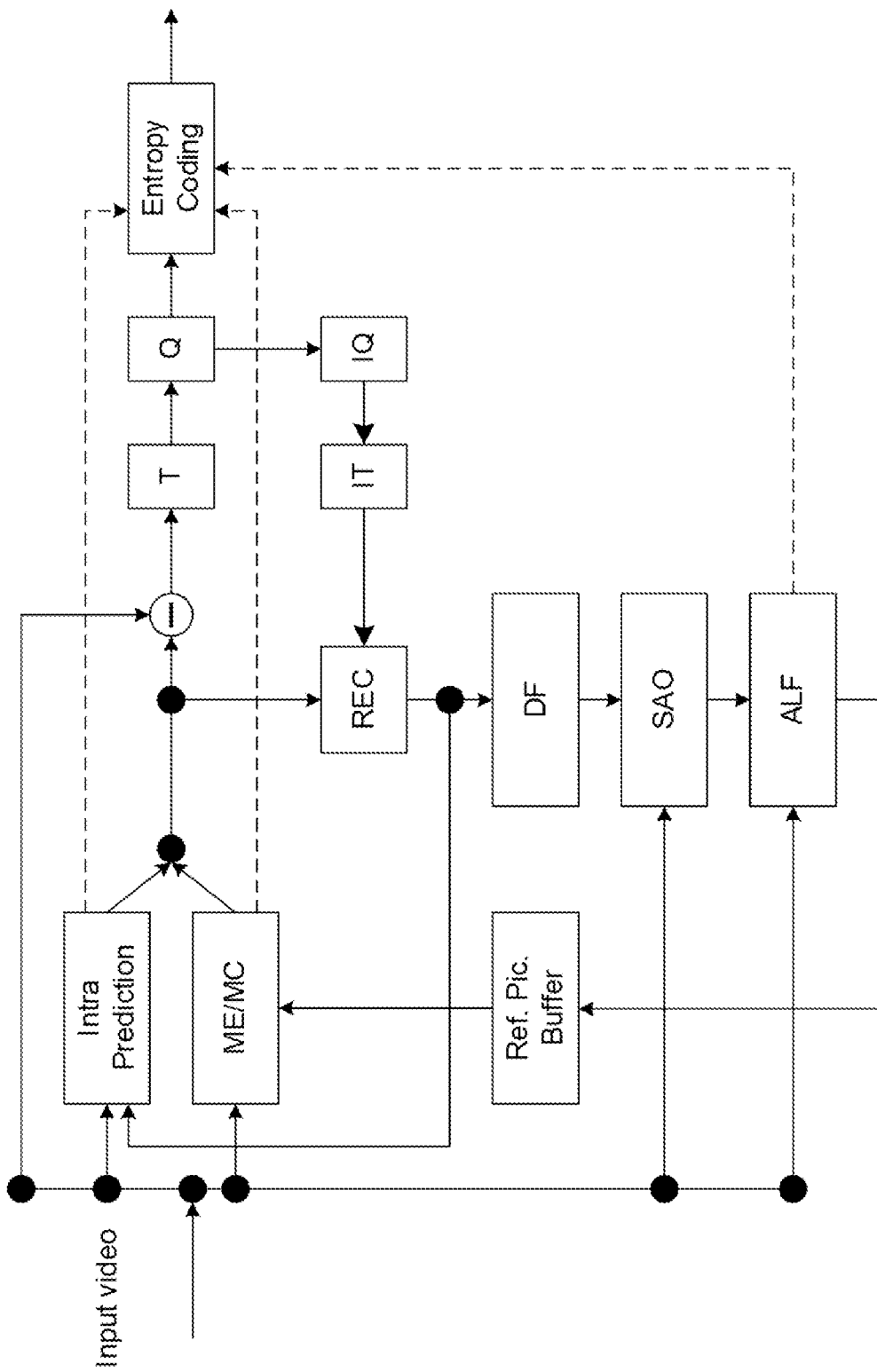
FIG. 7 shows an example of encoder block diagram.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., items 1-4).

Figure 3:
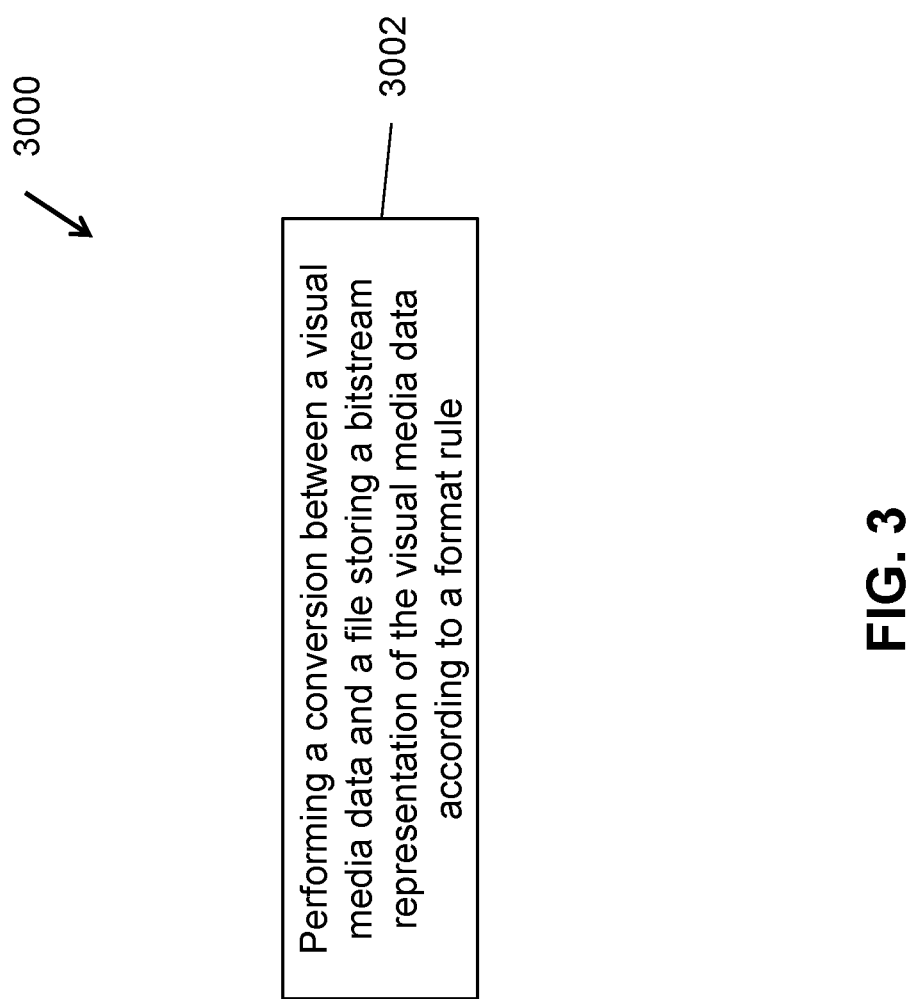
FIG. 3 is a flowchart for an example method of video processing.

1. A visual media processing method (e.g., method 3000 depicted in FIG. 3), comprising: performing (3002) a conversion between a visual media data and a file storing a bitstream representation of the visual media data according to a format rule; wherein the format rule specifies a constraint on information included in the file with respect to a profile, a tier, a constrain or a tier associated with the bitstream representation that is identified in the file.

2. The method of solution 1, wherein the format rule specifies that the file includes an identification of a profile to which an output layer set of the bitstream representation that is identified in the file conforms.

3. The method of any of solutions 1-2, wherein the format rule specifies that the tier that is identified in the file is equal to or higher than a highest tier indicated in all syntax structures to which an output layer set that is included in the file conforms.

4. The method of any of solutions 1-3, wherein the format rule specifies that the constraint identified in the file is aligned with corresponding values indicated by one or more constraint fields of syntax structures indicating constraint to which an output layer set in the file conforms.

5. The method of any of solutions 1-4, wherein the format rule specifies that the level identified in the file is aligned with corresponding values indicated by one or more level fields of syntax structures indicating a level to which an output layer set in the file conforms.

6. The method of any of solutions 1-5, wherein the conversion comprises generating a bitstream representation of the visual media data and storing the bitstream representation to the file according to the format rule.

7. The method of any of solutions 1-5, wherein the conversion comprises parsing the file according to the format rule to recover the visual media data.

8. A video decoding apparatus comprising a processor configured to implement a method recited in one or more of solutions 1 to 7.

9. A video encoding apparatus comprising a processor configured to implement a method recited in one or more of solutions 1 to 7.

10. A computer program product having computer code stored thereon, the code, when executed by a processor, causes the processor to implement a method recited in any of solutions 1 to 7.

11. A computer readable medium on which a bitstream representation complying to a file format that is generated according to any of solutions 1 to 7.

12. A method, apparatus or system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

Figure 8:

Technique 1. A method of processing visual media data (e.g., method 8000 depicted in FIG. 8), comprising: performing (8002) a conversion between a visual media file and a bitstream of a visual media data according to a format rule, wherein the bitstream includes one or more output layer sets and one or more parameter sets that include one or more profile tier level syntax structures, wherein at least one of the profile tier level syntax structures includes a general constraints information syntax structure, wherein the format rule specifies that a syntax element is included in a configuration record in the visual media file, and wherein the syntax element indicates a profile, a tier, or a level to which an output layer set identified by an output layer set index indicated in the configuration record conforms.

Technique 2. The method of technique 1, wherein the syntax element is a general profile indicator syntax element that indicates the profile to which the output layer set identified by the output layer set index conforms.

Technique 3. The method of technique 1, wherein the syntax element is a general tier syntax element that indicates a tier that is greater than or equal to a highest tier indicated in all profile tier level syntax structures to which the output layer set identified by the output layer set index conforms.

Technique 4. The method of technique 1, wherein the syntax element is a general tier syntax element that indicates a highest tier indicated in all profile tier level syntax structures to which the output layer set identified by the output layer set index conforms.

Technique 5. The method of technique 1, wherein the syntax element is a general tier syntax element that indicates a highest tier to which a stream associated with the configuration record conforms.

Technique 6. The method of technique 1, wherein the syntax element is a general tier syntax element that indicates a tier to which a stream associated with the configuration record conforms.

Technique 7. The method of technique 1, wherein the configuration record includes a general constraint information syntax element, wherein the format rule specifies that a first bit in the general constraint information syntax element corresponds to a second bit in all general constraint information syntax structures in all profile tier level syntax structures to which the output layer set identified by the output layer set index conforms, and wherein the format rule specifies that the first bit is set to one only if the second bit in all general constraint information syntax structures is set equal to one.

Technique 8. The method of technique 1, wherein the syntax element is a general level syntax element whose value indicates a level of capability that is greater than or equal to a highest level indicated in all profile tier level syntax elements to which the output layer set identified by the output layer set index conforms.

Technique 9. The method of technique 1, wherein the format rule specifies that the syntax element is disallowed from being associated with one or more other output layer sets included in a stream stored in the visual media file.

Technique 10. The method of any of techniques 1-9, wherein the conversion comprises generating the visual media file and storing the bitstream to the visual media file according to the format rule.

Technique 11. The method of any of techniques 1-9, wherein the conversion comprises generating the visual media file, and the method further comprises storing the visual media file in a non-transitory computer-readable recording medium.

Technique 12. The method of any of techniques 1-9, wherein the conversion comprises parsing the visual media file according to the format rule to reconstruct the bitstream.

Technique 13. The method of any of techniques 1 to 12, wherein the visual media file is processed by a versatile video coding (VVC).

Technique 14. An apparatus for processing visual media data comprising a processor and a non-transitory memory with instructions thereon, wherein the instructions upon execution by the processor, cause the processor to implement a method recited in one or more of techniques 1 to 13.

Technique 15. A non-transitory computer-readable storage medium storing instructions that cause a processor to implement a method recited in any of techniques 1 to 13.

Technique 16. A video decoding apparatus comprising a processor configured to implement a method recited in one or more of techniques 1 to 13.

Technique 17. A video encoding apparatus comprising a processor configured to implement a method recited in one or more of techniques 1 to 13.

Technique 18. A computer program product having computer code stored thereon, the code, when executed by a processor, causes the processor to implement a method recited in any of techniques 1 to 13.

Technique 19. A computer readable medium on which a visual media file complying to a file format that is generated according to any of techniques 1 to 13.

Technique 20. A method of visual media file generation, comprising: generating a visual media file according to a method recited in any of techniques 1 to 13, and storing the visual media file on a computer-readable program medium.

Technique 21. A non-transitory computer-readable recording medium storing a bitstream of a visual media file which is generated by a method performed by a video processing apparatus, wherein the method is recited in any of techniques 1 to 13. In some embodiments, a non-transitory computer-readable recording medium storing a bitstream of a visual media file which is generated by a method performed by a video processing apparatus, wherein the method comprises: generating the visual media file based on a visual media data according to a format rule, wherein the bitstream includes one or more output layer sets and one or more parameter sets that include one or more profile tier level syntax structures, wherein at least one of the profile tier level syntax structures includes a general constraints information syntax structure, wherein the format rule specifies that a syntax element is included in a configuration record in the visual media file, and wherein the syntax element indicates a profile, a tier, or a level to which an output layer set identified by an output layer set index indicated in the configuration record conforms.

Implementation 1. A method of processing visual media data (e.g., method 9000 depicted in FIG. 9), comprising: performing (9002) a conversion between a visual media file and a bitstream of a visual media data according to a format rule, wherein the format rule specifies a characteristic of a syntax element in the visual media file, wherein the syntax element has a value that is indicative of a number of bytes used for indicating a constraint information associated with the bitstream.

Implementation 2. The method of claim 1, wherein the format rule specifies that the syntax element is coded in the visual media file using six bits.

Implementation 3. The method of implementation 1, wherein the format rule specifies that the syntax element is coded in the visual media file immediately after a profile tier level multilayer enabled flag syntax element in the visual media file.

Implementation 4. The method of implementation 1, wherein the format rule specifies that the syntax element is coded in the visual media file specifies a number of bytes in a general constraint information syntax element in the visual media file, and wherein the format rule specifies that the value of the syntax element whose is equal to one indicates that a general constraint information flag in the general constraint information syntax element is equal to zero and that the general constraint information syntax element is disallowed from being included in a profile tier level record in the visual media file.

Implementation 5. The method of implementation 1, wherein the format rule specifies that a condition for including a general constraint information syntax element in the visual media file depends on whether the value indicated by syntax element is greater than one.

Implementation 6. The method of implementation 1, wherein the format rule specifies that a number of bits used for coding a general constraint information syntax element in the visual media file is a result of a multiplication of eight and the value that is indicative of the number of bytes used for indicating the constraint information, and wherein the format rule specifies that the result of the multiplication of eight and the value indicative of the number of bytes used for indicating the constraint information is not subtracted by two.

Implementation 7. A method of processing visual media data, comprising: performing a conversion between a visual media file and a bitstream of a visual media data according to a format rule, wherein the format rule specifies that five bits are used for a syntax element in the visual media file, wherein the syntax element has a value that is indicative of a network abstraction layer unit type in a decoder configuration record in the visual media file. In some embodiments, wherein the format rule specifies that five bits are used for another syntax element in the visual media file, and wherein the another syntax element has another value that is indicative of a network abstraction layer unit type in a decoder configuration record in the visual media file.

Implementation 8. A method of processing visual media data, comprising: performing a conversion between a visual media file and a bitstream of a visual media data according to a format rule, wherein a track in the visual media file comprises a video bitstream comprising one or more output layer sets; and wherein the format rule specifies that a syntax element is indicated for the track, wherein the syntax element indicates whether the track includes a video bitstream corresponding to a specific output layer set from the one or more output layer sets. In some embodiments, wherein a track in the visual media file comprises a video bitstream comprising one or more output layer sets, wherein the format rule specifies that another syntax element is indicated for the track, and wherein the another syntax element indicates whether the track includes a video bitstream corresponding to a specific output layer set from the one or more output layer sets.

Implementation 9. The method of implementation 8, wherein the syntax element indicates that the track includes the video bitstream corresponding to multiple output layer sets. In some embodiments, the another syntax element indicates that the track includes the video bitstream corresponding to multiple output layer sets.

Implementation 10. The method of implementation 8, wherein the syntax element indicates that the track includes the video bitstream not corresponding to the specific output layer set from the one or more output layer sets. In some embodiments, the another syntax element indicates that the track includes the video bitstream not corresponding to the specific output layer set from the one or more output layer sets.

Implementation 11. A method of processing visual media data, comprising: performing a conversion between a visual media file and a bitstream of a visual media data according to a format rule, wherein the format rule specifies whether the visual media file includes a syntax element whose value is indicative of an output layer set index used for indicating an output layer set. In some embodiments, the format rule specifies whether the visual media file includes another syntax element whose value is indicative of an output layer set index used for indicating an output layer set.

Implementation 12. The method of implementation 11, wherein the format rule specifies that the visual media file selectively indicates the syntax element whose value is indicative of the output layer set index in a decoder configuration record in response to another value of a profile tier present flag syntax element in the visual media file being equal to one or in response to a profile tier layer multilayer enabled flag being equal to one. In some embodiments, the format rule specifies that the visual media file selectively indicates the another syntax element whose value is indicative of the output layer set index in a decoder configuration record in response to another value of a profile tier present flag syntax element in the visual media file being equal to one or in response to a profile tier layer multilayer enabled flag being equal to one.

Implementation 13. The method of implementation 11, wherein the format rule specifies that the visual media file is disallowed from including the syntax element whose value is indicative of the output layer set index, and wherein the format rule specifies that the value of the output layer set index is inferred to be equal to a second value of a second output layer index of a second output layer set that includes only a layer carried in a track in response to a profile tier present flag syntax element being equal to one in the visual media file. In some embodiments, the format rule specifies that the visual media file is disallowed from including the another syntax element whose value is indicative of the output layer set index, and wherein the format rule specifies that the value of the output layer set index is inferred to be equal to a second value of a second output layer index of a second output layer set that includes only a layer carried in a track in response to a profile tier present flag syntax element being equal to one in the visual media file.

Implementation 14. The method of any of implementations 1-13, wherein the conversion comprises generating the visual media file and storing the bitstream to the visual media file according to the format rule.

Implementation 15. The method of any of implementations 1-13, wherein the conversion comprises generating the visual media file, and the method further comprises storing the visual media file in a non-transitory computer-readable recording medium.

Implementation 16. The method of any of implementations 1-13, wherein the conversion comprises parsing the visual media file according to the format rule to reconstruct the bitstream.

Implementation 17. The method of any of implementations 1 to 16, wherein the visual media file is processed by a versatile video coding (VVC).

Implementation 18. An apparatus for processing visual media data comprising a processor and a non-transitory memory with instructions thereon, wherein the instructions upon execution by the processor, cause the processor to implement a method recited in one or more of implementations 1 to 17.

Implementation 19. A non-transitory computer-readable storage medium storing instructions that cause a processor to implement a method recited in any of implementations 1 to 17.

Implementation 20. A video decoding apparatus comprising a processor configured to implement a method recited in one or more of implementations 1 to 17.

Implementation 21. A video encoding apparatus comprising a processor configured to implement a method recited in one or more of implementations 1 to 17.

Implementation 22. A computer program product having computer code stored thereon, the code, when executed by a processor, causes the processor to implement a method recited in any of implementations 1 to 17.

Implementation 23. A computer readable medium on which a visual media file complying to a file format that is generated according to any of implementations 1 to 17.

Implementation 24. A method of visual media file generation, comprising: generating a visual media file according to a method recited in any of implementations 1 to 17, and storing the visual media file on a computer-readable program medium.

Implementation 25. A non-transitory computer-readable recording medium storing a bitstream of a visual media file which is generated by a method performed by a video processing apparatus, wherein the method is recited in any of implementations 1 to 17. A non-transitory computer-readable recording medium storing a bitstream of a visual media file which is generated by a method performed by a video processing apparatus, wherein the method comprises: generating the visual media file based on a visual media data according to a format rule, wherein the format rule specifies a characteristic of a syntax element in the visual media file, wherein the syntax element has a value that is indicative of a number of bytes used for indicating a constraint information associated with the bitstream.

Operation 1. A method of processing visual media data (e.g., method 10000 depicted in FIG. 9), comprising: performing (10002) a conversion between a visual media file and a bitstream of a visual media data according to a format rule, wherein the format rule specifies a characteristic of a syntax element in the visual media file, and wherein the format rule specifies that the syntax element that has a value indicative of a level identification is coded in any one or both of a subpicture common group box or a subpicture multiple groups box using eight bits.

Operation 2. The method of operation 1, wherein the format rule specifies an absence of reserved bits immediately after the syntax element whose value is indicative of the level identification.

Operation 3. The method of operation 1, wherein the format rule specifies that 24 bits immediately after the syntax element whose value is indicative of the level identification are reserved bits.

Operation 4. The method of operation 1, wherein the format rule specifies that 8 bits immediately after the syntax element whose value is indicative of the level identification are reserved bits.

Operation 5. A method of processing visual media data, comprising: performing a conversion between a visual media file and a bitstream of a visual media data according to a format rule, wherein the format rule specifies characteristics related to a first syntax element, a second syntax element or a third syntax element set in the visual media file, wherein the first syntax element has a first value that is indicative of a number of active tracks in the visual media file, wherein the second syntax element has a second value that is indicative of a number of subgroup identifiers in the visual media file, and wherein each syntax element in the third syntax element set has a third value that is indicative of a number of active tracks in the visual media file. In some embodiments, wherein the format rule specifies characteristics related to a first syntax element, a second syntax element or a third syntax element set in the visual media file, wherein the first syntax element has a first value that is indicative of a number of active tracks in the visual media file, wherein the second syntax element has a second value that is indicative of a number of subgroup identifiers in the visual media file, and wherein each syntax element in the third syntax element set has a third value that is indicative of a number of active tracks in the visual media file.

Operation 6. The method of operation 5, wherein the format rule specifies that 16 bits are used to indicate the first syntax element having the first value indicative of the number of active tracks in a subpicture common group box in the visual media file.

Operation 7. The method of operation 5, wherein the format rule specifies that 16 bits are used to indicate the second syntax element having the second value indicative of the number of subgroup identifiers in a subpicture multiple groups box in the visual media file, and wherein the format rule specifies that 16 bits are used to indicate each syntax element in the third syntax element set having the third value indicative of the number of active tracks in the subpicture multiple groups box in the visual media file.

Operation 8. The method of operation 5, wherein the format rule specifies that 16 bits are reserved immediately after the first syntax element having the first value indicative of the number of active tracks, the second syntax element having the second value indicative of the number of subgroup identifiers, or each syntax element in the third syntax element set having the third value indicative of the number of active tracks are reserved.

Operation 9. The method of operation 5, wherein the format rule specifies an absence of reserved bits immediately after the first syntax element having the first value indicative of the number of active tracks, the second syntax element having the second value indicative of the number of subgroup identifiers, or each syntax element in the third syntax element set having the third value indicative of the number of active tracks are reserved.

Operation 10. The method of any of operations 1-9, wherein the conversion comprises generating the visual media file and storing the bitstream to the visual media file according to the format rule.

Operation 11. The method of any of operations 1-9, wherein the conversion comprises generating the visual media file, and the method further comprises storing the visual media file in a non-transitory computer-readable recording medium.

Operation 12. The method of any of operations 1-9, wherein the conversion comprises parsing the visual media file according to the format rule to reconstruct the bitstream.

Operation 13. The method of any of operations 1 to 12, wherein the visual media file is processed by a versatile video coding (VVC).

Operation 14. An apparatus for processing visual media data comprising a processor and a non-transitory memory with instructions thereon, wherein the instructions upon execution by the processor, cause the processor to implement a method recited in one or more of operations 1 to 13.

Operation 15. A non-transitory computer-readable storage medium storing instructions that cause a processor to implement a method recited in any of operations 1 to 13.

Operation 16. A video decoding apparatus comprising a processor configured to implement a method recited in one or more of operations 1 to 13.

Operation 17. A video encoding apparatus comprising a processor configured to implement a method recited in one or more of operations 1 to 13.

Operation 18. A computer program product having computer code stored thereon, the code, when executed by a processor, causes the processor to implement a method recited in any of operations 1 to 13.

Operation 19. A computer readable medium on which a visual media file complying to a file format that is generated according to any of operations 1 to 13.

Operation 20. A method of visual media file generation, comprising: generating a visual media file according to a method recited in any of operations 1 to 13, and storing the visual media file on a computer-readable program medium.

Operation 21. A non-transitory computer-readable recording medium storing a bitstream of a visual media file which is generated by a method performed by a video processing apparatus, wherein the method is recited in any of operations 1 to 13. In some embodiments, a non-transitory computer-readable recording medium storing a bitstream of a visual media file which is generated by a method performed by a video processing apparatus, wherein the method comprises: generating the visual media file based on a visual media data according to a format rule, wherein the format rule specifies a characteristic of a syntax element in the visual media file, and wherein the format rule specifies that the syntax element that has a value indicative of a level identification is coded in any one or both of a subpicture common group box or a subpicture multiple groups box using eight bits.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing visual media data, comprising:
   performing a conversion between a visual media file and
      a bitstream of a visual media data according to a format rule,
      wherein the format rule specifies characteristics of syntax elements in the visual media file,
      wherein the format rule specifies that a first syntax element that has a first value indicative of a level identification is coded in any one or both of a subpicture common group box or a subpicture multiple groups box using a first number of bits that is smaller than a second number of bits used for coding a second syntax element that indicates a number of active tracks,
      wherein the first number of bits is equal to eight bits;

wherein the format rule specifies the characteristics related to the second syntax element, a third syntax element or a fourth syntax element set in the visual media file, wherein the second syntax element has a second value that is indicative of the number of active tracks in the subpicture common group box in the visual media file, wherein the second number of bits is equal to sixteen bits, wherein the third syntax element has a third value that is indicative of a number of subgroup identifiers in the subpicture multiple groups box in the visual media file, wherein the format rule specifies that sixteen bits are used to indicate the third syntax element, and wherein each syntax element in the fourth syntax element set has a fourth value that is indicative of the number of active tracks in the subpicture multiple groups box in the visual media file, wherein the format rule specifies that sixteen bits are used to indicate each syntax element in the fourth syntax element set.

2. The method of claim 1,
wherein the format rule specifies an absence of reserved bits immediately after the first syntax element that has the first value that is indicative of the level identification.

3. The method of claim 1,
wherein the format rule specifies that 24 bits immediately after the first syntax element that has the first value that is indicative of the level identification are reserved bits.

4. The method of claim 1,
wherein the format rule specifies that 8 bits immediately after the first syntax element that has the first value that is indicative of the level identification are reserved bits.

5. The method of claim 1,
wherein the format rule specifies that 16 bits are reserved immediately after the second syntax element having the second value indicative of the number of active tracks, the third syntax element having the third value indicative of the number of subgroup identifiers, or each syntax element in the fourth syntax element set having the fourth value indicative of the number of active tracks are reserved.

6. The method of claim 1,
wherein the format rule specifies an absence of reserved bits immediately after the second syntax element having the second value indicative of the number of active tracks, the third syntax element having the third value indicative of the number of subgroup identifiers, or each syntax element in the fourth syntax element set having the fourth value indicative of the number of active tracks are reserved.

7. The method of claim 1, wherein the conversion comprises generating the visual media file and storing the bitstream to the visual media file according to the format rule.

8. The method of claim 1, wherein the conversion comprises generating the (Original) visual media file, and the method further comprises storing the visual media file in a non-transitory computer-readable recording medium.

9. The method of claim 1, wherein the conversion comprises parsing the visual media file according to the format rule to reconstruct the bitstream.

10. The method of claim 1, wherein the visual media file is processed by a versatile video coding (VVC).

11. An apparatus for processing visual media data comprising a processor and a non-transitory memory with instructions thereon, wherein the instructions upon execution by the processor, cause the processor to implement a method comprising:

perform a conversion between a visual media file and a bitstream of a visual media data according to a format rule, wherein the format rule specifies characteristics of syntax elements in the visual media file, wherein the format rule specifies that a first syntax element that has a first value indicative of a level identification is coded in any one or both of a subpicture common group box or a subpicture multiple groups box using a first number of bits that is smaller than a second number of bits used for coding a second syntax element that indicates a number of active tracks, wherein the first number of bits is equal to eight bits;

wherein the format rule specifies the characteristics related to the second syntax element, a third syntax element or a fourth syntax element set in the visual media file, wherein the second syntax element has a second value that is indicative of the number of active tracks in the subpicture common group box in the visual media file, wherein the second number of bits is equal to sixteen bits, wherein the third syntax element has a third value that is indicative of a number of subgroup identifiers in the subpicture multiple groups box in the visual media file, wherein the format rule specifies that sixteen bits are used to indicate the third syntax element, and wherein each syntax element in the fourth syntax element set has a fourth value that is indicative of the number of active tracks in the subpicture multiple groups box in the visual media file, wherein the format rule specifies that sixteen bits are used to indicate each syntax element in the fourth syntax element set.

12. The apparatus of claim 11,
wherein the format rule specifies an absence of reserved bits immediately after the first syntax element that has the first value that is indicative of the level identification.

13. A non-transitory computer-readable storage medium storing instructions that cause a processor to:

perform a conversion between a visual media file and a bitstream of a visual media data according to a format rule, wherein the format rule specifies characteristics of syntax elements in the visual media file, wherein the format rule specifies that a first syntax element that has a first value indicative of a level identification is coded in any one or both of a subpicture common group box or a subpicture multiple groups box using a first number of bits that is smaller than a second number of bits used for coding a second syntax element that indicates a number of active tracks, wherein the first number of bits is equal to eight bits;

wherein the format rule specifies the characteristics related to the second syntax element, a third syntax element or a fourth syntax element set in the visual media file, wherein the second syntax element has a second value that is indicative of the number of active tracks in the subpicture common group box in the visual media file, wherein the second number of bits is equal to sixteen bits, wherein the third syntax element has a third value that is indicative of a number of subgroup identifiers in the subpicture multiple groups box in the visual media file, wherein the format rule specifies that sixteen bits are used to indicate the third syntax element, and wherein each syntax element in the fourth syntax element set has a fourth value that is indicative of the number of active tracks in the subpicture multiple groups box in the visual media file, wherein the format rule specifies that sixteen bits are used to indicate each syntax element in the fourth syntax element set.

14. A non-transitory computer-readable recording medium storing a bitstream of a visual media file which is generated by a method performed by a video processing apparatus, wherein the method comprises:

generating the visual media file based on a visual media data according to a format rule, wherein the format rule specifies characteristics of syntax elements in the visual media file, wherein the format rule specifies that a first syntax element that has a first value indicative of a level identification is coded in any one or both of a subpicture common group box or a subpicture multiple groups box using a first number of bits that is smaller than a second number of bits used for coding a second syntax element that indicates a number of active tracks, wherein the first number of bits is equal to eight bits;

wherein the format rule specifies the characteristics related to the second syntax element, a third syntax element or a fourth syntax element set in the visual media file, wherein the second syntax element has a second value that is indicative of the number of active tracks in the subpicture common group box in the visual media file, wherein the second number of bits is equal to sixteen bits, wherein the third syntax element has a third value that is indicative of a number of subgroup identifiers in the subpicture multiple groups box in the visual media file, wherein the format rule specifies that sixteen bits are used to indicate the third syntax element, and wherein each syntax element in the fourth syntax element set has a fourth value that is indicative of the number of active tracks in the subpicture multiple groups box in the visual media file, wherein the format rule specifies that sixteen bits are used to indicate each syntax element in the fourth syntax element set.

* * * * *